United States Patent [19]

Wieder et al.

[11] 4,189,687
[45] Feb. 19, 1980

[54] COMPACT LASER CONSTRUCTION

[75] Inventors: Irwin Wieder, Los Altos; Robert H. Breedlove, Los Gatos, both of Calif.

[73] Assignee: Analytical Radiation Corporation, Los Altos, Calif.

[21] Appl. No.: 845,330

[22] Filed: Oct. 25, 1977

[51] Int. Cl.² ............................................. H01S 3/02
[52] U.S. Cl. ........................... 331/94.5 D; 331/94.5P; 331/94.5 PE
[58] Field of Search ..................... 331/94.5 D, 94.5 P, 331/94.5 PE, 94.5 G, 94.5 R; 313/46

[56] References Cited

U.S. PATENT DOCUMENTS

| | | | |
|---|---|---|---|
| 3,458,830 | 7/1969 | Geller et al. | 331/94.5 G |
| 3,460,053 | 8/1969 | Leonard | 331/94.5 G |
| 3,487,332 | 12/1969 | Cordy, Jr. | 331/94.5 P |
| 3,753,149 | 8/1973 | Kindl et al. | 331/94.5 G |
| 3,821,663 | 6/1974 | Brenner | 331/94.5 R |
| 3,831,104 | 8/1974 | La Marre et al. | 331/94.5 D |
| 4,064,466 | 12/1977 | Seki et al. | 331/94.5 G |

OTHER PUBLICATIONS

Kaslin et al., "Effect of Temperature on the Properties of Pulsed Laser Action on Electron Transistions in Dynamic Molecules", *Soviet Physics JETP*, vol. 27 No. 4, Oct. 1968, pp. 561–567.
Wladimiroff et al., "The Construction and Operational Analysis of an Interference—Free, Coaxial N2 Laser System", *Journal of Physics E*, vol. 10, 1977, pp. 361–369.
H. Heard, "Ultra-Violet Gas Laser at Room Temperature", *Nature*, Nov. 16, 1963, p. 667.
D. A. Leanard, "Saturation of the Molecular Nitrogen Second Positive Laser Transition", *APL* vol. 7, No. 1, Jul. 1, 1965, pp. 4–6.
D. T. Phillips, et al., "The Poor Man's Nitrogen Laser", *American Journal of Physics*, vol. 38, No. 5, May 1970, pp. 655–657.
L. R. Lidholt, "A Versatile 60 kV Switching System for Pulsed Excitation of Lasers", *The Review of Scientific Instruments*, vol. 43, No. 12, Dec. 1972, pp. 1765–1768.

*Primary Examiner*—James W. Davie
*Attorney, Agent, or Firm*—Thomas Schneck, Jr.

[57] ABSTRACT

A longitudinally excited gas laser having a laser tube in contact with a readily fabricated mass of material which conducts and dissipates heat generated in the tube, serves as part of a low inductance electrical transmission line for the laser tube discharge and aligns sections of the tube for ease of assembly and operation.

19 Claims, 12 Drawing Figures

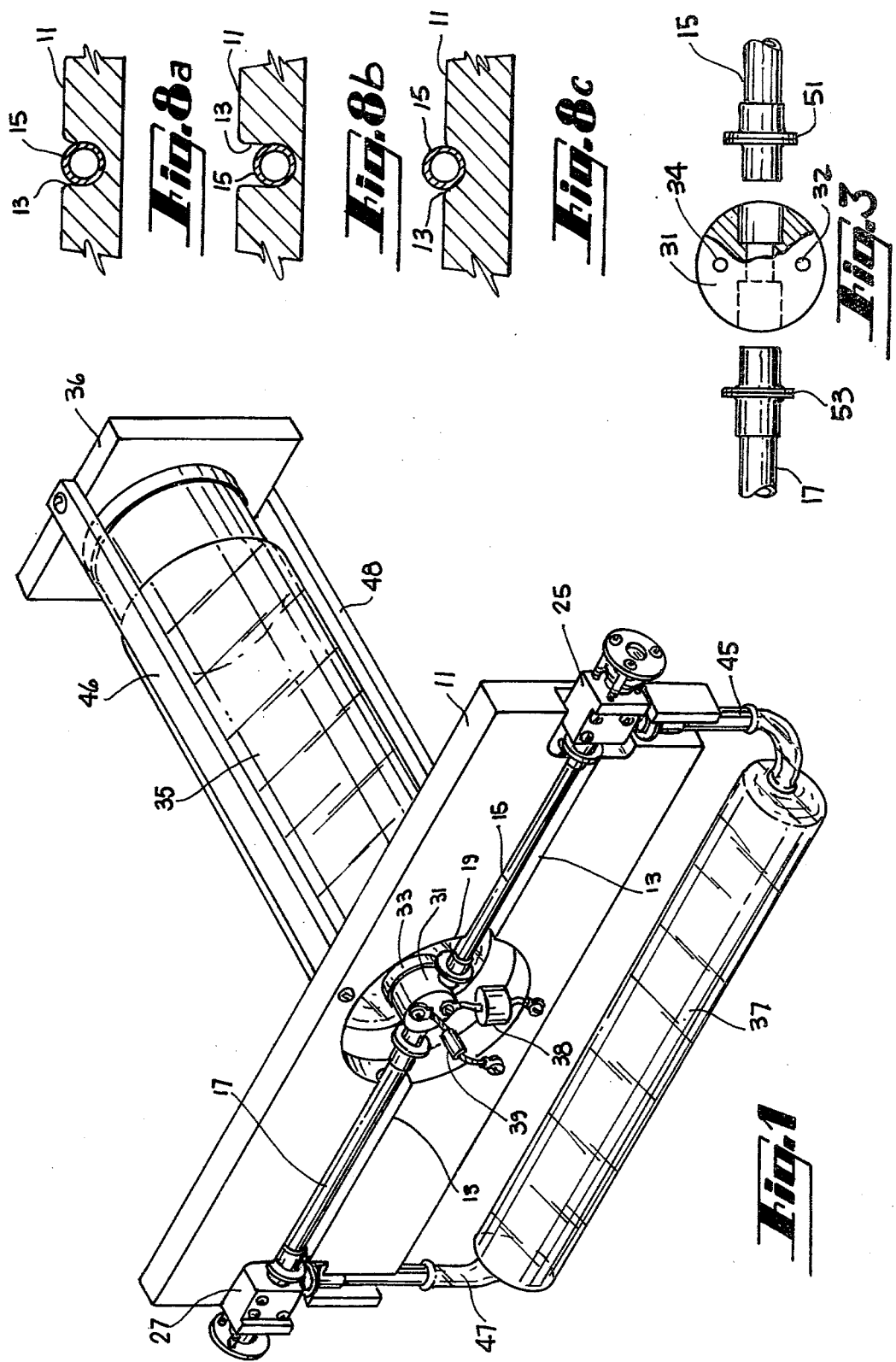

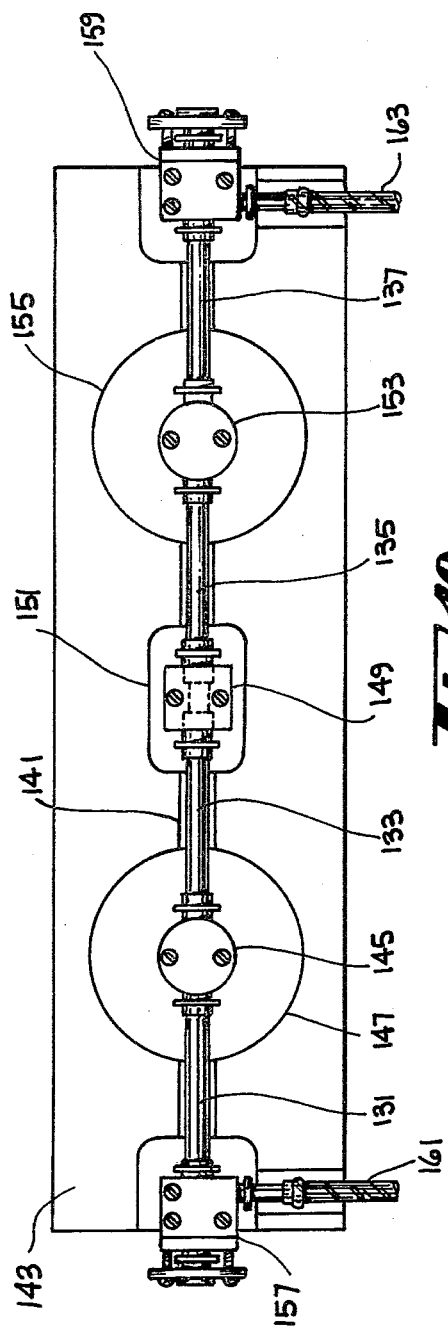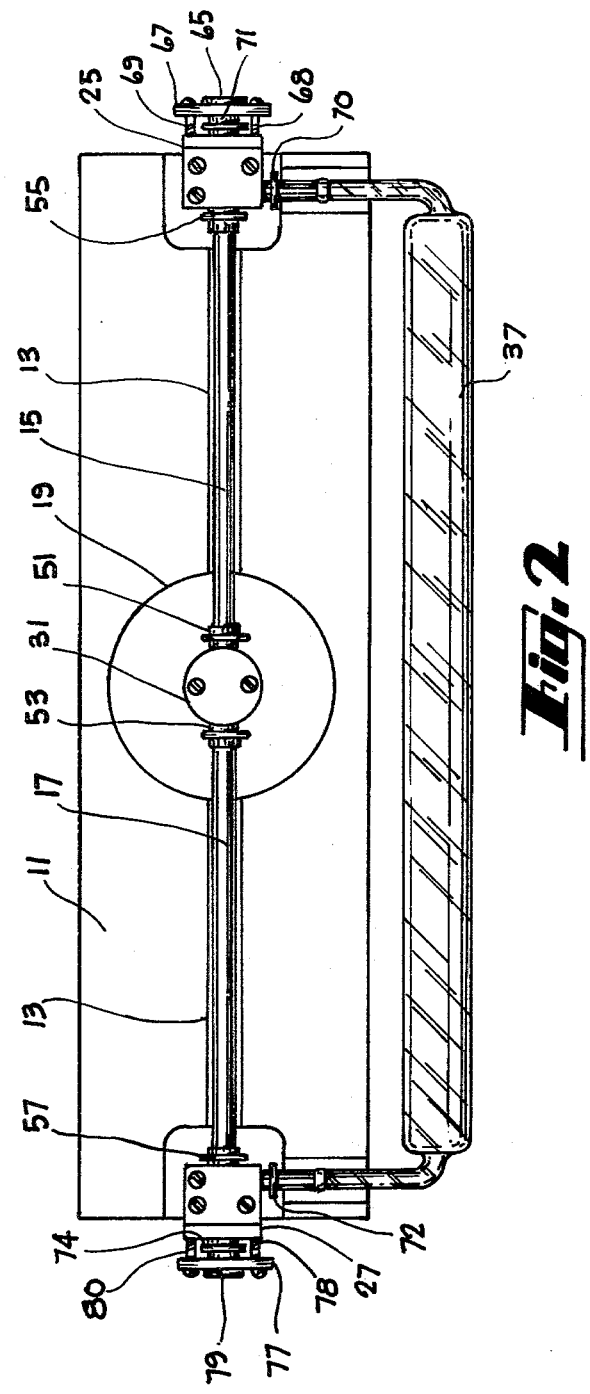

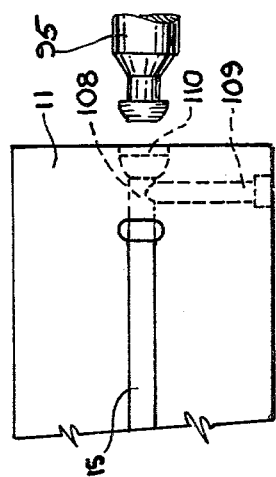
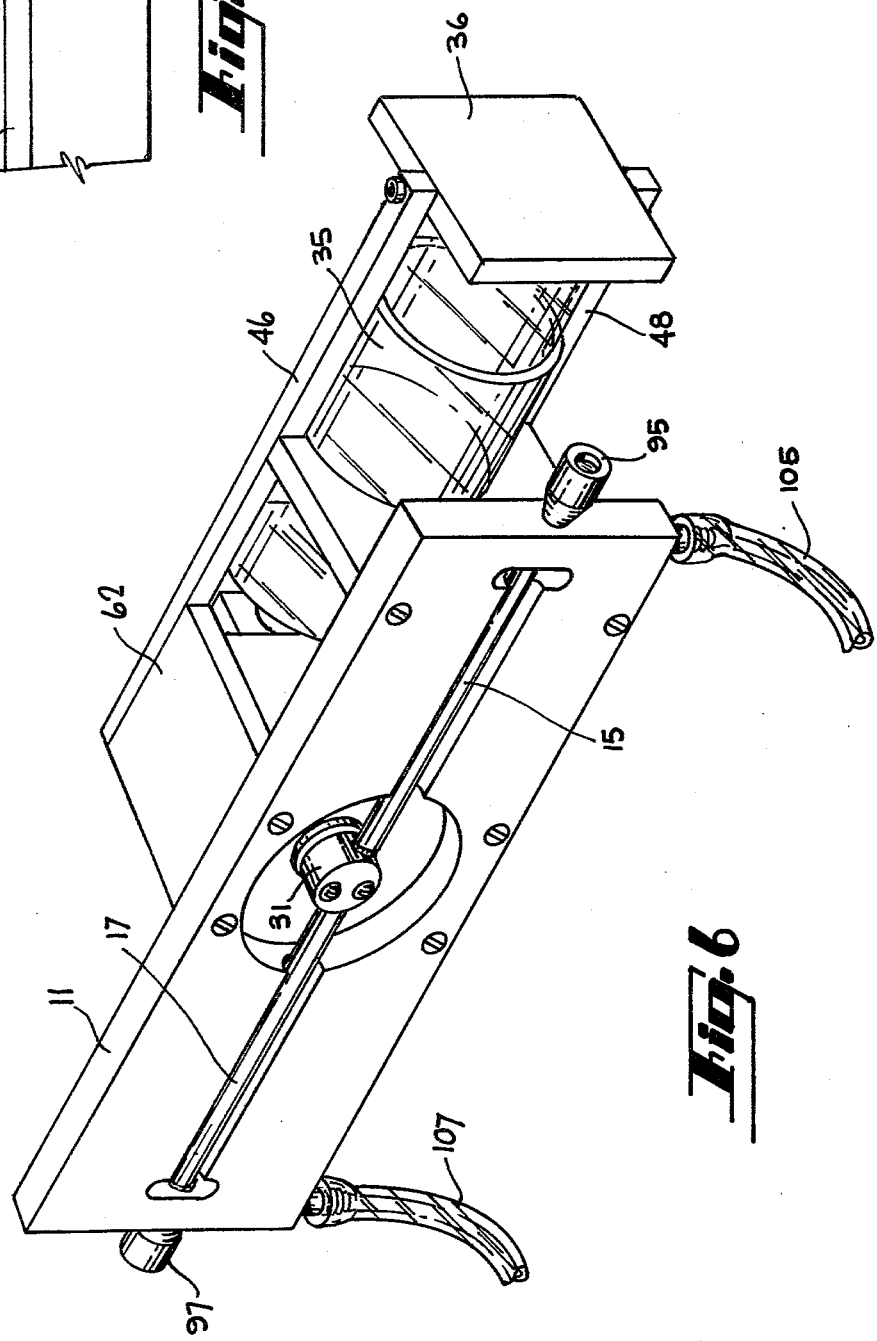

COMPACT LASER CONSTRUCTION

BACKGROUND OF THE INVENTION a. Field of the Invention

The invention relates to gas lasers and more particularly, to a pulsed gas laser construction.

b. Prior Art

After the discovery of the nitrogen laser in 1963 by H. G. Heard, it was realized that the initial longitudinal tube configuration was too inductive and that the laser medium was too long to excite its entire length during the short lifetime of the laser transition. This realization prompted work on transversely excited discharges which have very low inductances and utilize shorter discharge paths, see D. A. Leonard, App. Phys. Letters 7, 4 (1965). This approach raised the laser peak pulse output power, eventually to megawatts.

While the transversely excited nitrogen laser shows a vast improvement in efficiency over the first longitudinally pumped nitrogen laser, it suffers from two main drawbacks. First, the output beam is in the shape of a line transverse to the direction of light propagation, and second, the excitation tube would be difficult to operate in a sealed off mode, because of the need for seals along the full length of the laser tube.

Efforts have continued to improve longitudinally excited nitrogen lasers, and laser tubes have been developed with low inductance, coaxial construction, moderate discharge lengths, usually under 30 centimeters, and spark gap switching. For example, see U.S. Pat. No. 3,458,830 granted July 29, 1969 to Geller. There are numerous constructions for longitudinally excited nitrogen lasers in the prior art. These structures are generally coaxial with spark gas switching and are complex and inconvenient for assembly or replacement of the laser tube. Most of these structures ignore the problem of heat dissipation from the laser tube and the few that recognize the problem are too complex to be commercially useful. Finally, relatively few of these structures have been reported to operate with the gas laser tube sealed off, and those that do, use spark gap switching or have other undesirable features, such as laser pulse power decreasing as repetition rate is increased.

The spark gap switches in these prior art longitudinally excited lasers are undesirable because they must be dismantled and cleaned periodically. They are more susceptible to pulse jitter and are difficult to operate in a sealed off mode.

Accordingly, it is an object of the present invention to provide a low inductance, longitudinally excited, pulsed gas laser which allows for improved heat conduction from the laser tube, can operate in a gas flow mode or in a sealed off mode, with output power essentially independent of repetition rate, is compatible with thyratron switching, is relatively simple to fabricate and has a tube and thyratron which are easily replaced.

SUMMARY OF THE INVENTION

The above object is achieved in a compact laser construction wherein a solid mass of electrically and thermally conductive material is provided with an exposed slot wherein an electrically insulative, thermally conductive pipe containing gas for laser action is placed. The solid mass is an integral part of a low inductance electrical circuit which connects an electrode means of one polarity to one terminal of an energy storage capacitor, while an electrode means of another polarity is connected to the other terminal of the energy storage capacitor through a high voltage switch via another low inductance path. Both electrode means are in contact with the laser gas and provide excitation of the gas when the switch connects the energy storage capacitor across the electrodes.

The exposed slot of the solid mass permits easy removal and replacement of the pipe construction containing the laser gas. Moreover, the pipe may be made in sections with electrodes of opposite polarities at opposite ends of each pipe section for longitudinal excitation of the gas. Pipe sections are self-aligned because their positions are defined by the slot in the mass which serves as a jig for assembly of the apparatus, provided there is flexibility in the joints connecting the pipes to the electrodes.

The pipe is maintained in thermal contact with the solid mass so that the mass may act as a radiative heat sink for removing heat from the laser gas discharge.

A thyratron may be used as a high voltage switch which connects the energy storage capacitor across the laser tube. The thyratron anode is connected by a short bus to one of the laser electrode means, while the thyratron cathode is connected to the solid mass and another of the laser electrode means by buses placed about the thyratron. When the thyratron fires, energy is dumped from the energy storage capacitor into the gas column creating laser action. The laser gas discharge and the solid mass which partially surrounds the discharge perform as a first portion of a transmission line, while the thyratron and the buses placed thereabout perform as a second portion of a transmission line. Both transmission line portions are characterized by low inductance which contributes to a rapid gas discharge for the laser of the present invention, i.e. about 50 nanoseconds or less with nitrogen as the laser gas. The heat sink character of the solid mass and the thermal conductivity of the pipe sections contribute to rapid thermal recovery between pulses and a corresponding high operating repetition rate capability.

BRIEF DESCRIPTION OF THE DRAWINGS

FIG. 1 is a perspective view of a gas laser of the present invention.

FIG. 2 is a frontal elevation of the apparatus shown in FIG. 1.

FIG. 3 is an exploded cutaway view of the central electrode of the apparatus of FIG. 1.

FIG. 6 is a perspective view of an alternate embodiment of the laser of FIG. 1.

FIG. 7 is a detail showing construction of an end of the laser of FIG. 6.

FIGS. 8a, 8b and 8c are cross-sectional details showing alternate nesting construction for pipe sections within the solid mass shown in FIG. 1.

FIG. 10 is a frontal elevation of another alternate embodiment of the laser construction of FIG. 1.

DESCRIPTION OF THE PREFERRED EMBODIMENT

Figure 9:
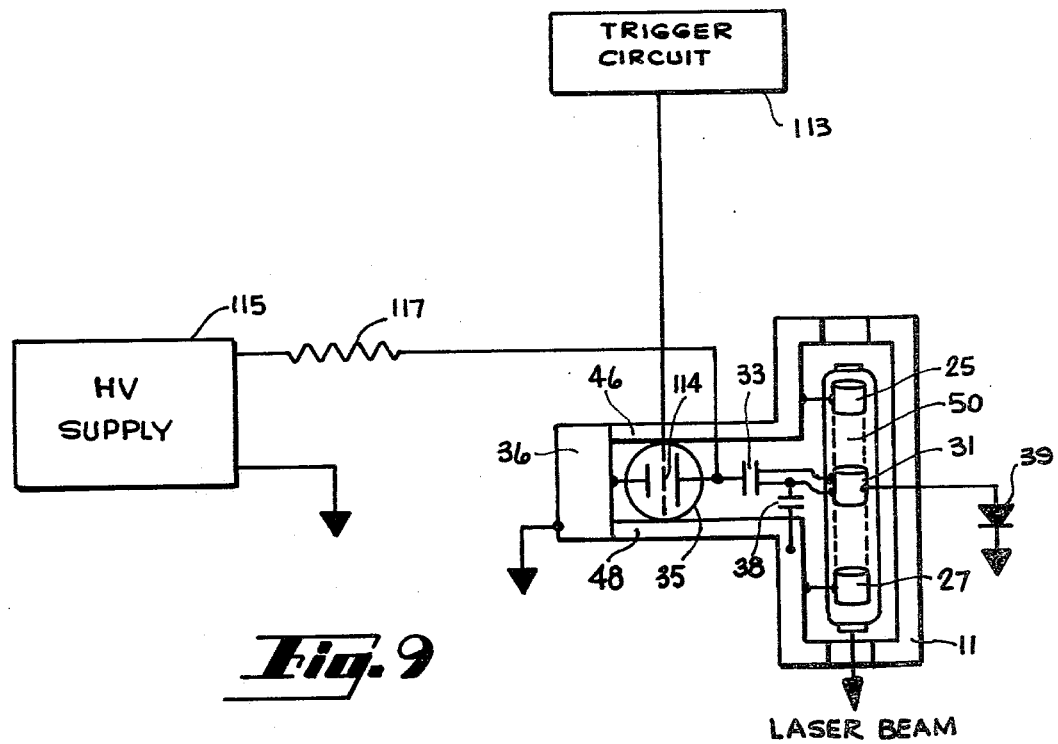
FIG. 9 is a combined electrical schematic and diagramatic view showing operation of the apparatus of FIG. 1 and FIG. 6.

In FIG. 1, a solid mass 11, made of heat and electrically conducting material, such as aluminum, has a slot 13 extending centrally along the length thereof with dimensions for receiving an electrically insulative hollow pipe formed from pipe sections 15, 17, which are made from a material with good thermal conductivity such as ceramic. Each of the pipe sections 15, 17, has an electrically conductive distal end closure 25, 27, respectively. A central electrode 31, forming a first electrode means, is disposed on an end of each of the pipe sections 15, 17, opposite respective end closures 25, 27, forming second electrode means. The solid mass 11 is a thin rectangular plate in shape, approximately 1.5 cm thick, while the slot depth is less than the plate thickness.

The length of mass 11 extends the full length of the pipe sections 15, 17, plus approximately half the length of the end closures 25, 27, or about 35 cm. The exact length of mass 11 is not critical, as long as the mass maintains good electrical contact with the end closures 25, 27, and good thermal communication with pipe sections 15, 17. Thickness of mass 11 exceeds the thickness of pipe sections 15, 17, by 50 percent, although this is not critical. Positioning of the pipe sections in mass 11 is discussed below with reference to FIGS. 8a, 8b and 8c.

Mass 11 provides a low inductance current return path for an electrical discharge through the pipe sections 15, 17, of the laser tube. The electrical discharge and the mass together form a first portion of an electrical transmission line, which is a low inductance current path to provide for short tube discharge times. That low inductance path is extended to thyratron tube base 36 by conductive buses 46, 48, which electrically connect base 36 to mass 11. The buses, in combination with the thyratron, form a second portion of a transmission line in series with the first transmission line portion. In lieu of the buses 46, 48, a metal envelope, ventilated with holes, could be provided about the thyratron to extend the low inductance path from mass 11 to base 36.

A cylindrical cavity 19 in the central portion of slot 13 houses central electrode 31 and is spaced far enough from mass 11 to provide an air gap sufficient for electrical insulation therewith. Alternatively, the central electrode may be shielded from mass 11 with other insulative material. The solid mass 11 is in electrical contact with the end closures 25, 27, and maintains the same electrical potential therewith. Screws through end closures 25, 27, hold the closures in good electrical contact with mass 11 and provide convenient means for assembly or tube replacement.

Besides providing electrical insulation from central electrode 31, the cutout 19 in mass 11 allows access to energy storage capacitor 33 located very close to the central electrode 31, with a low inductance connection provided. Thyratron tube 35 is shown to be mounted perpendicular to the central electrode 31. An alternate low inductance mounting is shown in FIG. 6 discussed below. Returning to FIG. 1, thyratron 35 is a high voltage switch, connected to a laser power supply not shown, and a trigger circuit. The thyratron functions as a switch for allowing the energy stored in energy storage capacitor 33 to be delivered to the laser tube, as described below. Auxiliary capacitor 38 and high voltage diode 39 are fastened with short low inductance leads between central electrode 31 and mass 11.

The tube illustrated in FIG. 1 is a sealed off tube, i.e., one having a sealed supply of lasing material. To replenish gas which is in the pipe sections 15, 17, a reservoir 37 is connected to opposite end closures 25, 27, through the opposed conduits 45, 47, which are respectively sealed to the reservoir 37 and to each respective end closure 25, 27. Gas from reservoir 37 migrates into the pipe sections 15, 17, maintaining gas capable of laser action in the pipe sections. The volume of reservoir 37 is approximately 50 to 100 times the gas volume contained in pipe sections 15, 17, although this is not critical. The heat transfer characteristics of the present invention enable operation at high repetition rates in the sealed off mode without degradation of laser power in contradistinction with prior art lasers.

FIG. 2 shows a side elevation of the laser tube construction of the present invention. It will be seen that pipe section 15 is connected to the end closure 25 by a first flange pair 55 and by a second flange pair 51 to the central electrode 31. Similarly, pipe section 17 is connected to end closure 27 by a third flange pair 57 and by a fourth flange pair 53 to the central electrode 31. A fifth flange pair 70 connects end closure 25 with the right side of reservoir 37, while a sixth flange pair 72 connects end closure 27 to the left side.

Each end closure has an optical means for establishing laser action mounted distal from the hollow central electrode. For example, the end closure 25 has an axial channel therethrough and a mirror 65 mounted on an adjustment plate 67. Mirror 65 communicates directly with pipe section 15, with an optical path extending through pipe section 17, through end closure 27, all the way to mirror 79, where a portion of the radiation is folded back, and a portion is allowed to pass therethrough. Mirror pairs need not be used to establish laser action. Sometimes a single mirror is sufficient, especially for nitrogen lasers. In the present embodiment, mirror reflective coatings are protected by quartz so that the discharge does not wear away or erode the mirror coating.

It will be seen that the mounting plate 67 for mirror 65 has adjusting screws 68, 69, plus a third adjusting screw not shown, for adjusting the angle which the mirror 65 makes with pipe section 15. The mounting plate 67 is connected to end closure 25 through a seventh flange pair 71.

Similarly, end closure 27 has an axial channel therethrough which extends outwardly through an eighth flange pair 74. Both the seventh and eighth flange pairs 71, 74, permit flexing so that the angle of mirrors 65, 79, respectively may be varied to establish resonance within pipe sections 15, 17.

Adjusting screws 78, 80, plus a third adjusting screw not shown, permit movement of the mounting plate 77 and mirror 79 so that resonance can be established through pipe sections 15, 17, for a lasing material within those pipe sections. Laser action will not occur unless each of the mirrors is critically aligned to permit multiple reflections through the pipe sections 15, 17, all the way to the opposing mirror and back. In the case of nitrogen, end mirrors are not so important as with other lasers. Some output is derived with only one back and forth pass, as would result from utilizing only one mirror.

FIG. 3 shows the hollow central electrode 31 which received the pipe sections 15 and 17. Electrode 31 is a conductive cylinder, with a hollow tubular portion perpendicular to the axis of symmetry of the electrode and aligned with pipe sections 15, 17, for passage of the laser beam and gas column therethrough. Electrode 31 need not be cylindrical, but this shape is most usual for preventing arc-over from the central electrode to the mass 11 which is at ground potential. Each of the pipe sections 15, 17, is connected to the central electrodes through a flange pair 51, 53, as described more fully below. The central electrode 31 is seen to have two holes, 34, 32, extending therethrough, one for attaching central electrode 31 to an energy storage capacitor behind it, and the other for attaching a high voltage diode or resistor and a secondary capacitor to ground.

Figure 4:
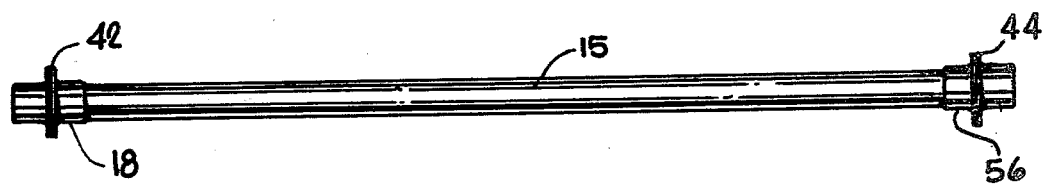
FIG. 4 is a side elevation view of a pipe section forming a portion of the laser shown in FIG. 1.

FIG. 4 shows a side view of a representative pipe section 15. The pipe is made of electrically insulative, thermally conductive material, such as ceramic, with copper-nickel sleeves 18, 56, brazed thereon, by depositing a thin metal layer on the pipes where the sleeves are to be positioned and then brazing the sleeves to the metal layers. Each of the metal sleeves 18, 56, includes a rim 42, 44, respectively, which forms one half of a flange pair. The overall length of each pipe section is approximately 15 centimeters.

Figure 5:
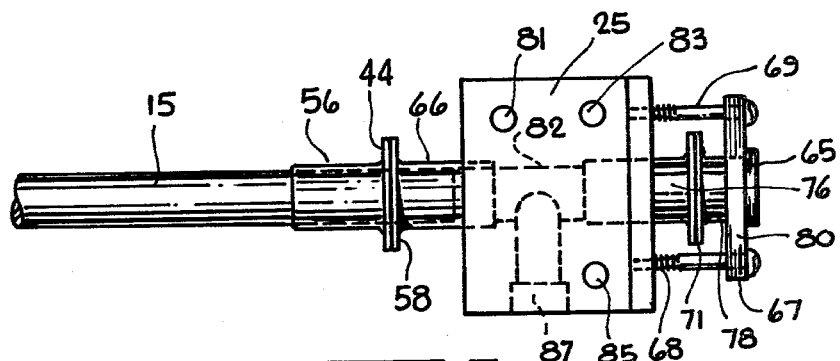
FIG. 5 is a frontal view of an end electrode construction for the laser shown in FIG. 1.

With reference to FIG. 5, the detailed assembly of end closure 25 is illustrated. Also illustrated is the construction of the flange pairs which are used to join opposite ends of respective pipe sections to connected members. As explained with reference to FIG. 4, pipe section 15 has a metal sleeve 56 which, in turn, has a rim 44 extending therefrom. Closure 25 has a short cylindrical sleeve 66 which fits into a channel 82 extending through the end closure. The inside diameter of sleeve 66 and channel 82 is approximately equal to the outside diameter of the pipe section 15. Sleeve 66 is preferably made of the same material as metal sleeve 56 and includes a rim 58 of a diameter approximately equal to the diameter of rim 44. The two rims are brought into abutting contact with each other. Each rim has a slight tilt or edge bias such that contact is made with a facing rim at the outer peripheral edges thereof and the two rims are welded together at the edges, forming a flange pair which maintains vacuum conditions. Eight such flange pairs were described with reference to the description of FIG. 2 and two such flange pairs were described in FIG. 3. One of the characteristics of each flange pair is that a slight amount of bending of connected pipe members is possible because the thin wall welded rims may be slightly and resiliently bent without destroying the integrity of the connection between members.

Returning to FIG. 5, on the opposite side of end closure 25, mounting plate 67 for mirror 65 has a sleeve 78 with a rim which forms a portion of the flange pair 71. A sleeve 76, similar to sleeve 66 is disposed in channel 82 opposite the sleeve 66. Sleeve 76 also has a rim which forms a member of the flange pair 71, together with sleeve 78.

Mirror mounting plate 67 has a channel extending therethrough so that the laser beam in pipe 15 can communicate with mirror 65 through channel 82 in end closure 25 and through the sleeves 66, 76 mounted therein. Adjusting screws 68, 69, and a third screw not shown, permit angular adjustment of mirror 65 by creating bending moments in the flange pair 71 to an extent such that optical paths normal to mirror 65 and the opposed mirror 79, necessary for laser action, may be established.

A gas port 87 is drilled into end closure 25 to communicate with the central axial channel 82 therethrough for providing gas to the central channel, either from reservoir 37, shown in FIG. 1, or from a tank supply, not shown.

End closure 25 includes three holes 81, 83, 85, so that the end closure may be bolted to mass 11. When a laser tube is to be replaced, it is merely unbolted from mass 11 at holes 81, 83, 85, and corresponding holes at the other end and at the central electrode. Returning to FIG. 2, since the tube fits in the longitudinal slot 13 in mass 11 and since there is some amount to flexibility in the flange pairs connecting the pipe sections 15, 17, to the central electrode and to the end closures, a laser tube may be automatically aligned upon placement in slot 13. Thus, large amounts of time, which might be devoted to laser section alignment, may now be saved.

FIG. 6 shows an alternate embodiment of the apparatus of FIG. 1 wherein the mass 11 is mounted parallel to the axis of symmetry of thyratron tube 35. This low-inductance geometry may be preferable when adequate depth is not present behind the mass 11 for mounting the tube perpendicular to the mass, as in a shallow cabinet. The apparatus of FIG. 6 also illustrates an alternative end construction for pipe sections 15, 17. Mass 11 has mirrors in holders 95, 97, forming an optical mirror means for reflecting light back and forth within the pipe sections 15, 17, and through the central hollow electrode 31. The holders 95, 97, may have windows mounted at the Brewster angle with external mirrors for reflecting light, rather than internal mirrors.

Gas is supplied to the interior of pipe sections 15, 17, through a gas flow means comprising an input hose 105 which continuously feeds the respective pipe sections from a remote supply, such as a gas cylinder, not shown, through a hole in the mass 11 which communicates with an end of the pipe sections and is exhausted through another hole in mass 11 through hose 107.

It will be noted that in FIG. 6 the laser tube is constructed without the flange pairs shown in FIG. 2 which join the various electrodes to the pipe sections 15, 17. In FIG. 6, epoxy is used to join respective sections of the laser tube to central electrode 31 and to the mass 11.

Thyratron 35 is supported on socket plate 36, with buses 46, 48, 62 joining plate 36 to mass 11 providing a portion of the low inductance current return path for current flowing in the thyratron 35. A plate similar to plate 62 and below the thyratron is obscured by mass 11. All plates are at a common D.C. potential and contribute to a low inductance transmission line portion of which mass 11, partially surrounding the laser tube, forms another portion. Capacitors and a high voltage diode of the type shown in FIG. 1 are present, but not shown.

FIG. 7 illustrates construction of the ends of the laser tube of FIG. 6. The mass 11 has the end of pipe section 15 projecting into a hollow chamber in an end of mass 11. A first channel 108 is drilled in mass 11 in alignment with the pipe section 15 for an optical path to the mirror means 95 of FIG. 6. A second channel 109 is drilled orthogonal to the channel 108 and makes contact therewith for allowing passage of gas from a reservoir or a tank supply into the channel 108 and the pipe section 15. The opposite end of the laser tube is constructed in a similar fashion. The mirror means 95 which is seated in joint 110 is a conventional mirror and is aligned with the opposite mirror before the expoxy hardens. Mirror alignment may be accomplished by a ball and socket joint wherein the female part of the joint 110 is milled and lapped to fit the corresponding male joint in mirror means 95. The alignment is completed before the epoxy hardens.

FIG. 8a shows a section of a first construction of the slot 13 of mass 11 for seating a pipe section 15. The depth of the slot is approximately equal to the diameter of the pipe section, with about one-half of the periphery of the pipe section in thermal contact with mass 11.

FIG. 8b shows a second construction of the slot 13 of mass 11 for seating a pipe section 15. The depth of the slot is greater than the diameter of the pipe section, with approximately one-half the periphery of the pipe section in thermal contact with mass 11.

FIG. 8c shows a third construction of the slot 13 of mass 11 for seating a pipe section 15. The depth of the slot is approximately one-half the diameter of the pipe section, with approximately one-half of the periphery of the pipe section in thermal contact with mass 11.

Slot 13 extending through the mass 11 is only slightly larger in width than the diameter of pipe sections 15, 17. In particular, if the outer diameter of a pipe section is one centimeter, the width of the slot would be approximately 1.002 to 1.000 centimeters. These dimensions permit the pipe sections 15, 17 to nest snugly within the axial slot 13 to achieve good thermal contact therewith and to permit the two pipe sections to be self-aligned for ease of assembly of the apparatus. To increase thermal contact a thermally conducting paste such as Dow Corning #340 can be applied to the small spaces between the pipe sections and mass 11.

Slot 13 may be readily manufactured using relatively few passes with a milling machine through the mass 11, after which the cutout is made.

FIG. 9 is an electrical schematic of the laser of the present invention. The hollow central electrode 31 is represented by an annular structure at the center of laser tube 50 in FIG. 9. End electrodes are represented by annular electrodes 25, 27. The thyratron switch 35 is connected to a trigger circuit 113, to an energy capacitor 33 and a high voltage supply 115. Capacitor 33 which is about 1300 pf. is also connected to this power supply through a charging resistor 117. A high voltage diode 39, or a resistor, is connected between central electrode 31 and ground. Discharge capacitor 38 has a value of about 500 pf. and discharges through the laser tube without passing through the thyratron. The value of diode 39 and charging resistor 117 depends on the thyratron characteristics, voltage of the system and repetition rate. Thyratron 35 may be of the type 5C22 using a charging voltage of 16 kv from supply 115. None of these values is critical and substitutions will be realized by those skilled in the art. For example, a programmable solid state supply such as a constant current or constant power supply may be used, thus eliminating charging resistor 117.

The hydrogen thyratron 35 is fired by the trigger circuit 113 which allows the capacitor 33 to charge capacitor 38 and to discharge through the tube 50. Use of a hydrogen thyratron limits pulse jitter present in spark gap switches of the prior art, while the thermal properties of the quasi-parallel transmission line construction of the laser seated in mass 11 allows the tube to be fired at relatively high pulse repetition rates, i.e., 300 pps and higher at powers of 50 kilowatts and higher in sealed off mode without excessive heat buildup which would cause power drop off. To promote even faster cooling of mass 11, radiative fins and forced air or water cooling means could be disposed about the mass for greater heat transfer. However, this has not been found necessary at the pulse rate and power previously mentioned.

In flow operation, nitrogen gas at a pressure of about 5 torr has been used from a tank supply and an auxiliary vacuum system, not shown, must be used to flow gas through the tube. The flowing gas also contributes to cooling in that case.

After the proper tube pressure is attained either in flow or sealed off mode, energy storage capacitor 33 is charged to the supply voltage of high voltage supply 115 through charging resistor 117. After energy storage capacitor 33 is charged, trigger circuit 113 delivers a signal to the grid 114 of thyratron 35 which suddenly fires grounding the high voltage side of capacitor 33. The opposite side of the energy storage capacitor 33 is suddenly raised to a high voltage of opposite polarity to the charging voltage. Prior to tube breakdown, discharge capacitor 38 is charged. After tube breakdown both capacitors 38 and 33 discharge through the tube and since capacitor 38 can discharge through a lower inductance path, its resulting current pulse is faster than the current pulse resulting from the discharge of capacitor 33. Current is discharged through the laser tube to end electrodes 25, 27, at ground potential.

Electrons from capacitor 33 flow through the laser tube from the center electrode 31 to the end electrodes 25, 27, through the low inductance mass 11, through low inductance buses 46, 48, to tube base plate 36 back into the thyratron 35. Electrons from capacitor 38 flow from the center electrode 31 to the end electrodes 25, 27, through low inductance mass 11 back to capacitor 38.

FIG. 10 shows an alternate embodiment of the apparatus of FIG. 1 wherein a plurality of pipe sections 131, 133, 135, 137 are nested in the axial slot 141 in mass 143. The pipe sections are made of electrically insulative, thermally conductive material, as previously described, and are maintained in thermal contact with the mass 143 by fitting snugly into slot 141 in the same manner as described with reference to FIGS. 8a, 8b and 8c.

Electrodes of alternating polarity connect adjacent pipe sections. For example, electrode 145 is disposed in the circular cutaway region 147 in mass 143. Electrode 145 connects pipe section 131 to 133 and has a construction identical to the electrode described with reference to FIG. 3. Pipe sections 133 and 135 are connected by electrode 149 which is a conductive block electrically and mechanically connected to mass 143 in a cutout region 151 which accommodates it. Electrode 149 has a gas channel extending therethrough which communicates with the inside of pipe sections 133, 135. Pipe sections 135, 137, are connected by means of electrode 153 which is mounted in a circular cutaway region 155 in the same manner as electrode 145 is mounted in cutaway region 147. At the extreme opposite ends of the pipe sections, electrodes 157, 159, are electrodes which are identical to electrodes 25, 27 in FIG. 1. Both of the electrodes 145, 153, are electrically connected together and maintained at the same potential, while all of the electrodes, 149, 157 and 159, are all connected to solid mass 143 and maintained at the same potential. A metal bus is connected between electrodes 145 and 153 for maintaining a low inductance path therebetween. The thyratron switch means, described in FIG. 1, is mounted near the electrodes 145, 153, in the manner shown in FIG. 1.

Gas may be supplied to the pipe sections of FIG. 10 either in the manner shown with reference to FIG. 1 or in the manner shown with reference to FIG. 6. That is, the laser of FIG. 10 may be operated either in the flow mode or in the sealed off mode. In either case, gas is accessible to the gas column in the pipe sections and the electrodes therebetween from ports 161, 163, communicating with the end electrodes 157, 159.

Returning to FIG. 1, the low inductance transmission line path provided by the buses and mass 11 enables a high current discharge through the tube. The split laser tube construction with a central electrode discharging toward end electrodes coupled with the favorable inductance and cooling functions provided by mass 11 represents an improvement in gas laser technology for which the following claims are made.

What is claimed is:

1. A self-aligned low inductance laser comprising, a solid mass of material having an exposed straight slot extending therethrough, and laser tube means confining a gaseous laser medium and having opposed optical means defining a laser cavity, said cavity having at least one output element, a pumping means, and electrodes for generating a longitudinally excited gas laser discharge, said laser tube means comprising a plurality of pipe sections mutually connected by flexible flanges, said pipe sections disposed in said exposed slot in contact therewith.

2. A laser of the type having a hollow gas confining pipe with one or more sections and end closures for confining a length of gas therebetween, a gas capable of lasing disposed within said pipe, optical resonator means with at least one output element, one or more insulated electrodes of one polarity in contact with said gas and energy means, including a power supply, for producing a high current discharge along the axis of the pipes and through said gas, the improvement comprising;
a solid mass of material having good heat and electrical conduction properties and having a slot extending therethrough with dimensions for maintaining thermal contact with substantial portions of a hollow insulative pipe mounted therein, said mass capable of conducting and radiating heat transferred from said hollow pipe, said mass forming a part of a low inductance open transmission line in conjunction with the electrical gas discharge within said hollow gas confining pipe.

3. A compact pulsed gas discharge laser construction comprising,
a solid mass of heat and electricity conducting material having an exposed slot therein,
an electrically insulative hollow pipe with closed opposite ends confining a column of gaseous laser material therein, said hollow pipe in thermal contact with said exposed slot of said solid mass, said mass disposed partially about said hollow pipe,
opposed optical means defining a laser cavity on opposite ends of said gas column in said hollow pipe for establishing laser action therein, said laser cavity having at least one output element,
a first electrode means insulated from said mass in contact with said gas column and a second electrode means in electrical contact with said mass, for longitudinal excitation of said gas column and
switch means for discharging an electrical capacitor between said first and second electrode means and through said gas column, said mass and said gas discharge column forming a first portion of a low inductance transmission line for fast laser discharge times.

4. The apparatus of claim 3 wherein said electrically insulative hollow pipe is composed of thermally conducting material.

5. The hollow pipe of claim 4 wherein said electrically insulative thermal conducting material is ceramic.

6. The apparatus of claim 3 wherein said switch means is disposed between electrically conductive buses, said buses forming a second portion of said electrical transmission line in conjunction with said switch, said second transmission line portion being in series with said first transmission line portion.

7. The apparatus of claim 3 further defined by a reservoir communicating with said hollow pipe, said reservoir containing gas capable of laser action, and being sealed from ambient atmosphere.

8. The apparatus of claim 3 further defined by gas flow means for continuously flowing gas through said hollow pipe.

9. The apparatus of claim 3 wherein said switch is a thyratron.

10. The apparatus of claim 3 wherein said solid mass is a rectangular plate.

11. The apparatus of claim 3 wherein said first electrode means is a conductive cylinder having an axis of symmetry, said axis being transverse to said gas column in said hollow pipe.

12. The apparatus of claim 3 wherein said solid mass has a central cylindrical cavity defined therein which accommodates said first electrode means.

13. The apparatus of claim 3 wherein said insulative hollow pipe comprises a plurality of pipe sections mutually connected by first and second electrode means of alternating polarity.

14. The apparatus of claim 3 wherein said pipe is closed at opposite ends by said second electrode means comprising end electrodes, each a conductive housing having an axial channel therethrough aligned with the interior of said hollow pipe and electrically connected to said solid mass.

15. The apparatus of claim 14 wherein said end closures each include mounts for adjusting said optical means for establishing laser action.

16. The apparatus of claim 14 wherein said conductive housings have gas ports connected to a reservoir, said reservoir containing gas capable of lasing.

17. The apparatus of claim 3 wherein said gas is nitrogen.

18. The apparatus of claim 3 wherein said slot contacts up to one-half of the periphery of said pipe.

19. The apparatus of claim 13 wherein said pipe sections are in nested contact with the slot in said mass for alignment therein.

* * * * *